July 29, 1930.  F. E. BENZING  1,771,608
GEAR SHIFT MECHANISM FOR MOTOR VEHICLES
Filed Feb. 1, 1929  5 Sheets-Sheet 1
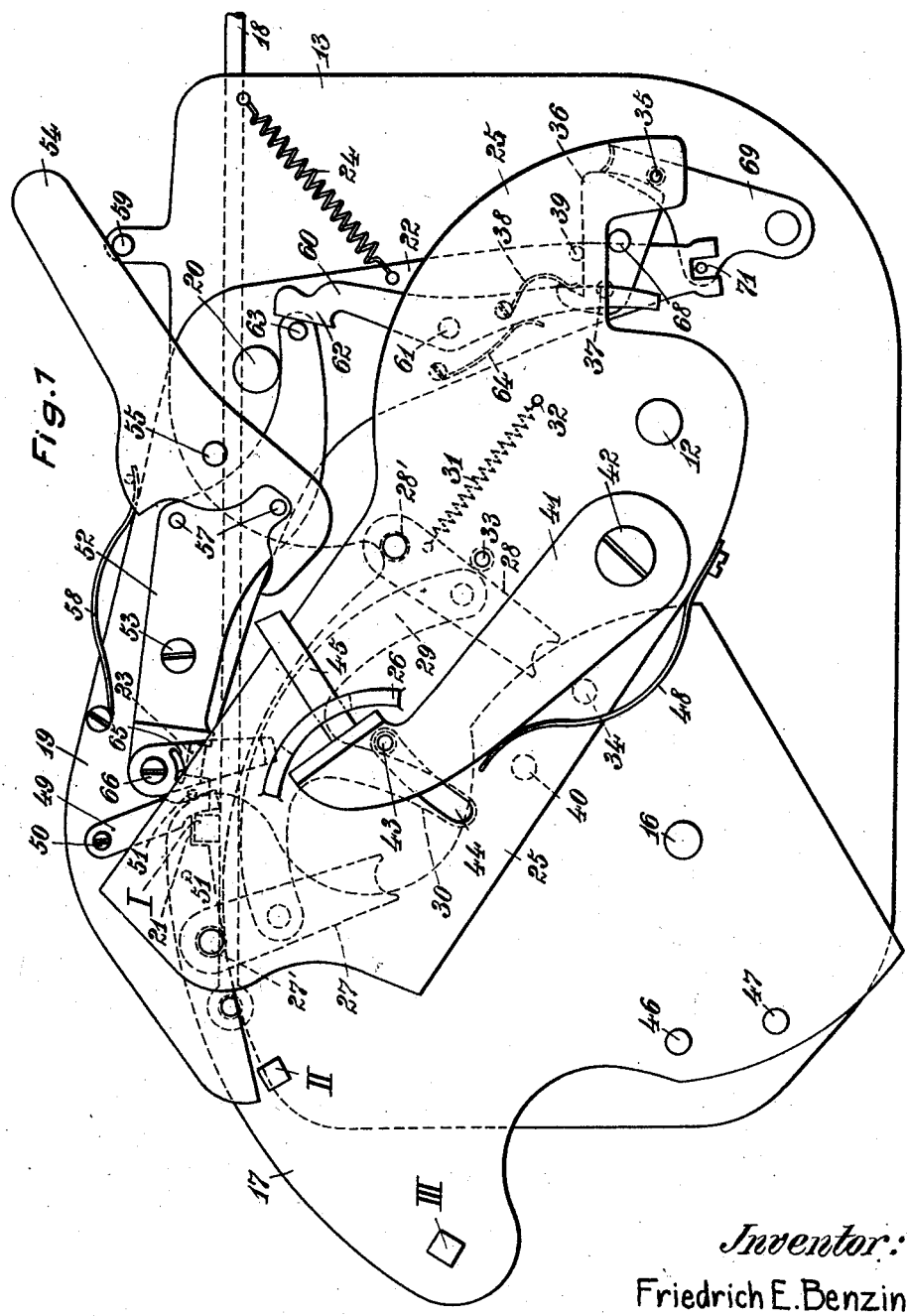
Inventor:
Friedrich E. Benzing
BY
A. W. Deller
ATTORNEY July 29, 1930.  F. E. BENZING  1,771,608
GEAR SHIFT MECHANISM FOR MOTOR VEHICLES
Filed Feb. 1, 1929  5 Sheets-Sheet 2
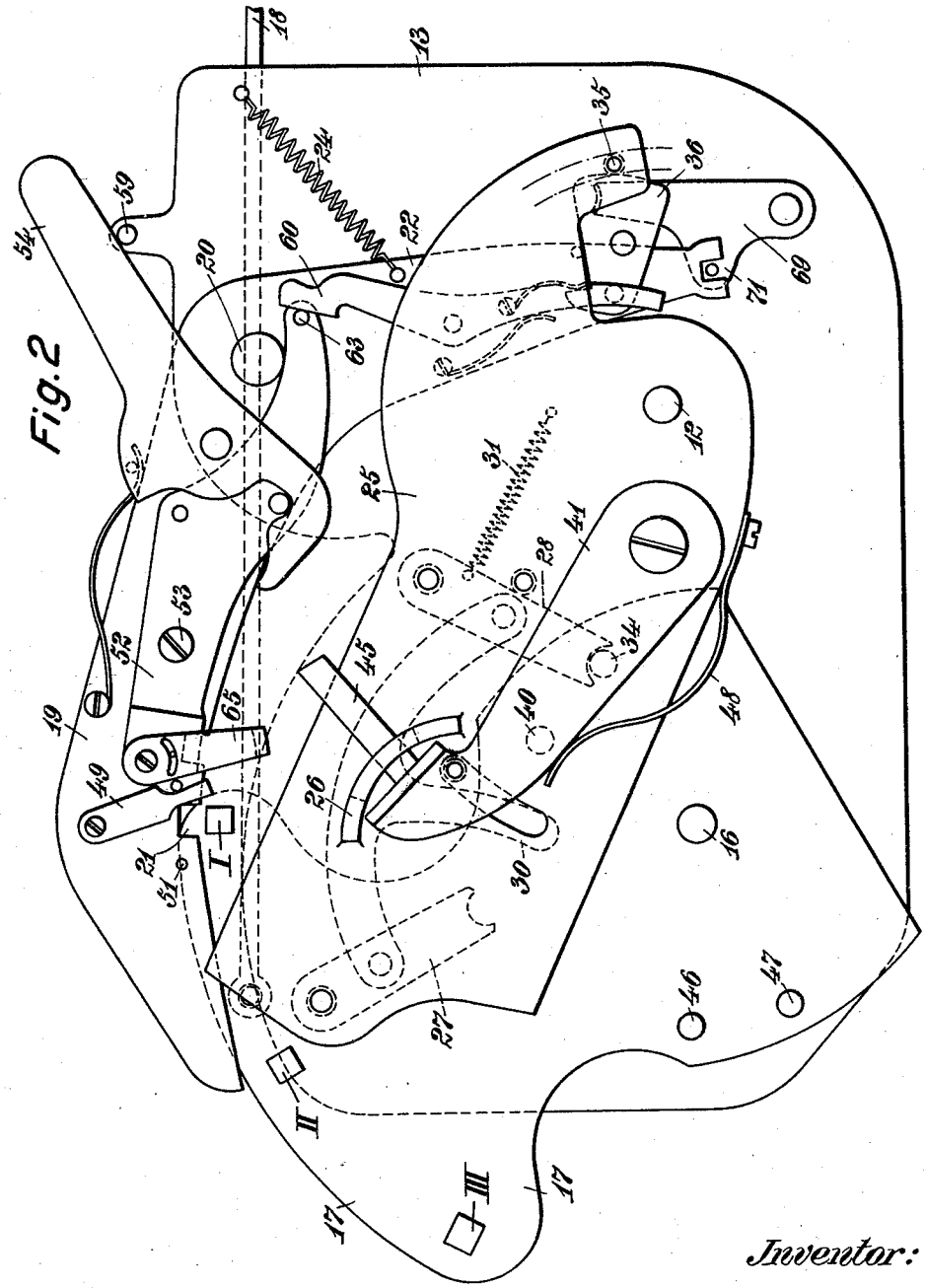
Inventor:
Friedrich E. Benzing
BY
a. W. Deller
ATTORNEY

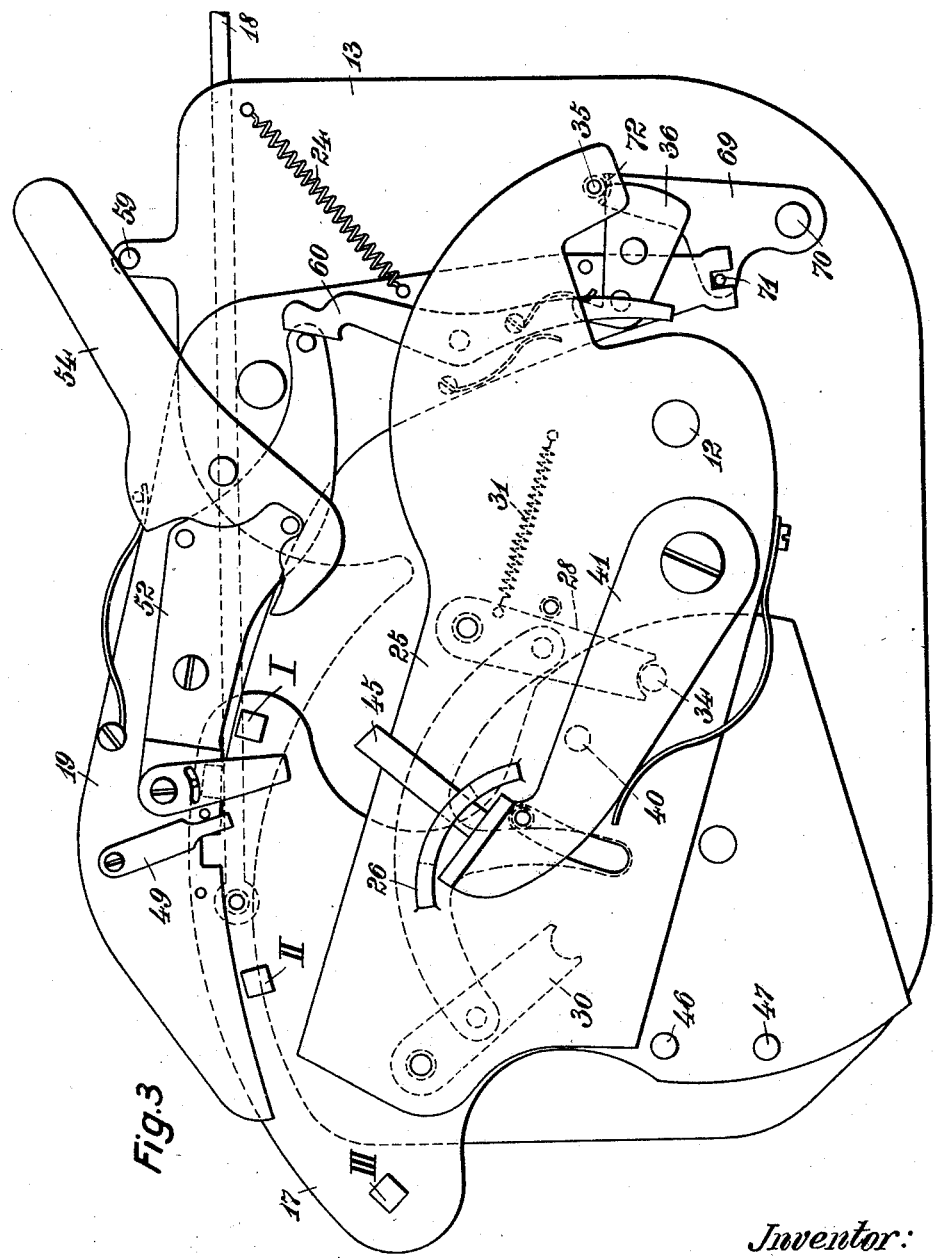

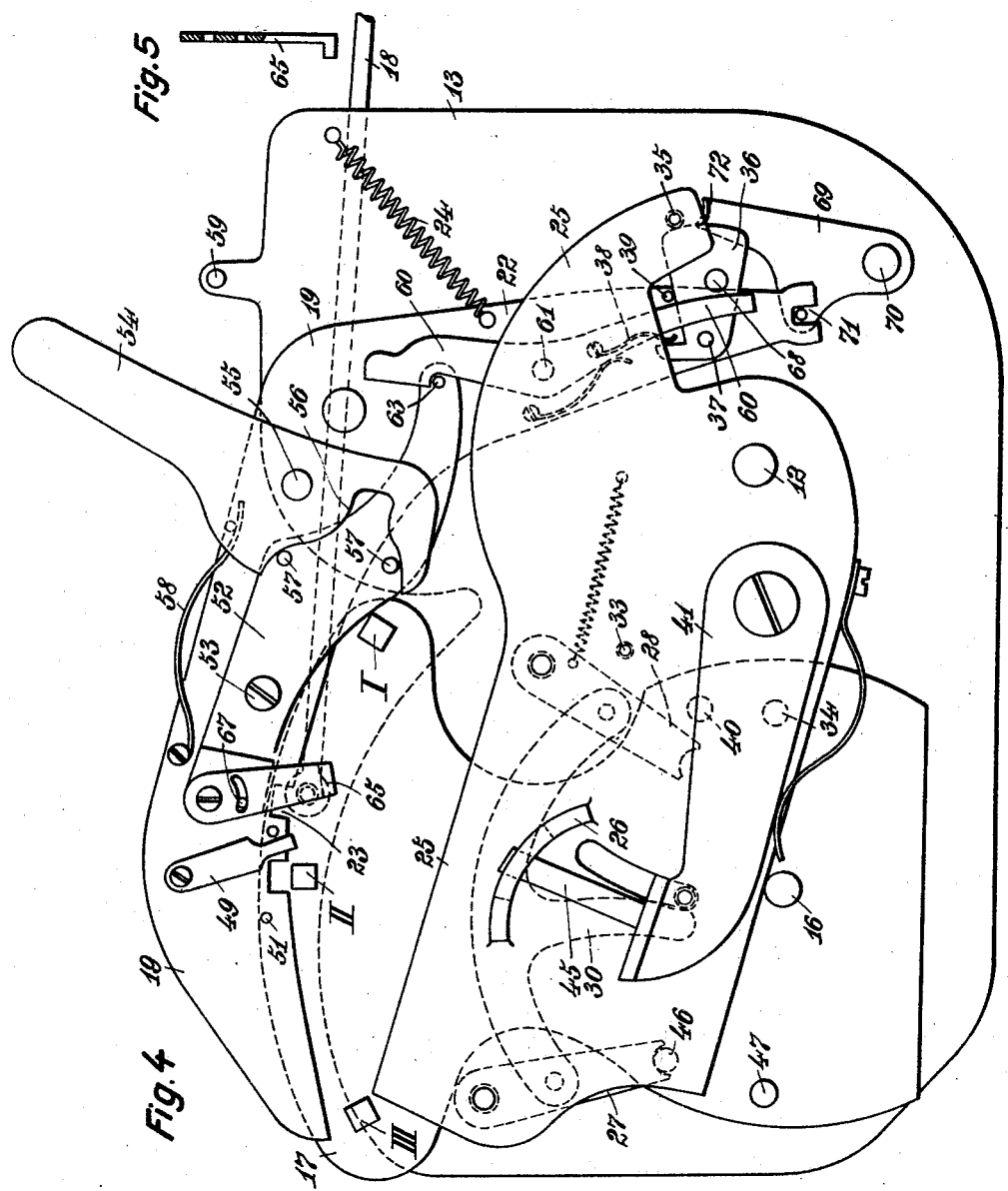

July 29, 1930.  F. E. BENZING  1,771,608
GEAR SHIFT MECHANISM FOR MOTOR VEHICLES
Filed Feb. 1, 1929   5 Sheets-Sheet 5

Inventor:
Friedrich E. Benzing
BY
ATTORNEY

Patented July 29, 1930

1,771,608

UNITED STATES PATENT OFFICE

FRIEDRICH ERNST BENZING, OF SCHWENNINGEN-ON-THE-NECKAR, GERMANY

GEAR-SHIFT MECHANISM FOR MOTOR VEHICLES

Application filed February 1, 1929, Serial No. 336,798, and in Germany November 10, 1926.

My invention for which I have filed application in Germany, Nov. 10, 1926, relates to a gear shift mechanism for motor vehicles and is primarily designed for motor vehicles of the type in which the power transmitting system includes a clutch and a shiftable gear having a gear shift lever adapted to stepwise shift the gear into different speeds corresponding to different positions of the lever. A shiftable gear of such construction is in extended use for motor-cycles.

In vehicles of this type the gear shifting operation requires a complicated and cumbersome manipulation, as it involves the necessity of simultaneously handling and controlling the clutch actuating member ordinarily formed by a pedal, the gear shift lever, the gas control, and in addition to these operations the vehicle must be kept balanced.

One object of my invention is to simplify the gear shift operation by means of a mechanism permitting this whole operation to be performed by a single manipulation, preferably by stepping on a pedal. Another object of my invention is to provide a gear shift mechanism of this character which is of a simple and rugged construction and may easily be attached to existing motor cycles without necessitating a change in the vital parts thereof.

Other more specific objects of my invention will appear from the description hereinafter and the features of novelty will be pointed out in the claims. A preferred embodiment of my invention is shown in the accompanying drawings in which Fig. 1 illustrates an elevation of the gear shift mechanism in first speed, just before it is shifted into second, the clutch pedal being pressed down so far as to disengage the clutch;

Fig. 2 is a similar view illustrating the position of the parts at a subsequent moment in which the clutch pedal has been pressed down a little further to release the gear shift lever preparatory to the shifting proper;

Fig. 3 illustrates a later phase in the operation in which the clutch pedal has been pressed down so far as to shift the gear shift lever towards its second speed position;

Fig. 4 shows the mechanism in second speed as the clutch is pressed down to shift into neutral;

Fig. 5 represents a side view, partly in section, of the abutment lever 65;

Figure 6:
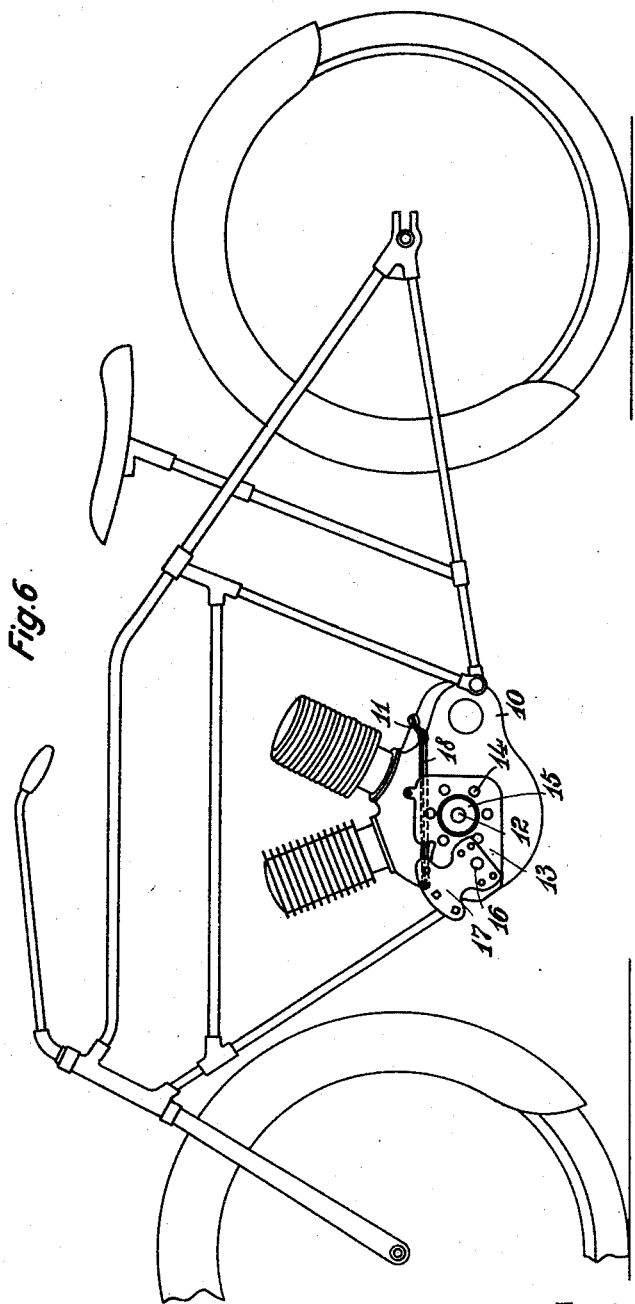
Fig. 6 is a diagrammatic representation of a motor cycle to which my mechanism has been attached.

Although my invention is applicable to any motor vehicle having a gear shiftable into successive speeds and coupled with a clutch, it offers particular advantages in case of motor cycles having such gear. In Fig. 6 I have shown such a motor-cycle. 10 designates the combined gear and crank casing enclosing a selective sliding gear of well known construction which does not form part of my invention and for this reason need not be described in detail. It serves to change the ratio between the speed of the engine and the speed of the rear wheel and its gears are set by turning a vertical shaft extending from casing 10 to different angular positions corresponding to the different speeds. On this shaft a horizontal arm 11 is mounted which has its free end linked to the gear shift lever. The clutch is also enclosed in the casing 10 and is operated by turning a horizontal shaft 12 extending from the casing in horizontal direction.

In the drawings my invention is shown as applied to a motor cycle which is known on the German market as "Wanderer", 5.4 H. P. sport model 1926. In order to attach my mechanism the manually operable gear shift lever is disconnected from the arm 11 and removed, and a base plate 13 is mounted on the lateral face of the casing 10 in the manner shown in Fig. 6.

A plurality of bolts inserted in suitable holes 14 and screwed into the casing serve to firmly keep the base plate 13 in place. The base plate is provided with a central hole 15 through which the clutch actuating shaft extends. On a pivot 16 mounted on the base plate 13 a lever 17 is carried which is to be linked to the arm 11 by means of link 18 and which thus replaces the original gear shift lever. For this reason, it will be referred to in the following as gear shift lever. For sake of simplicity, in Fig. 6 the other parts incorporated in my mechanism are omitted, merely the base plate 13 and the gear shift lever 17 with link 18 being shown to illustrate the manner, how my mechanism is to be attached to the motor cycle. If other types of motor cycles are to be provided with my mechanism everybody skilled in the art may easily design the arrangements necessary to apply the base plate 13 and to connect the gear shift lever 17 with the member operative to shift the gears.

A suitable locking means, preferably in the form of a lever 19, serves to arrest and to lock gear shift lever 17 in any one of its alternative operative positions into which it is to be shifted in order to shift the gears. In the embodiment shown this locking lever 19 is mounted on a pivot 20 on the base plate 13 and has a horizontal arm provided with a recess 21 and a vertical arm 22. The gear shift lever 17 situated in a plane adjacent to that of the locking lever carries three lateral pins I, II, III adapted to alternatively engage the recess 21, as will appear from Figs. 1 and 4. When pin I is in engagement with the recess, the gear shift lever 17 is set to first speed and, accordingly, pins II, III serve to lock the gear shift lever 17 in its second speed or third speed position, respectively.

The upper arm of lever 19 is, furthermore, provided with an auxiliary recess 23 which may be brought into engagement with pin I, to set the gear shift lever to its neutral position. A spring 24 is extended between a suitable point of the base plate and the arm 22 tending to keep the locking lever in engagement with one of the pins I, II, III.

The shaft 12 is provided with a suitable clutch actuating member, preferably in the form of a pedal. In the embodiment shown, the pedal is formed by a plate 25 arranged parallel to the base plate 13 and in front of the locking lever 19. Since the clutch operated by shaft 12 is subjected to the action of springs tending to keep the clutch in its engaged position, as is customary in the art, the clutch pedal 25 tends to remain in its upper clutch engaging position, which is somewhat higher than that shown in Fig. 1. The foot plate of the pedal is indicated at 26. In order to perform the shifting of lever 17 coincidentally with the clutch actuation in an automatic fashion, I have cooperatively connected to the clutch actuating member 25 means arranged to temporarily engage the gear shift lever 17 to shift the same by one step for every reciprocation of the clutch actuating member 25. In the embodiment shown these means comprise a pawl mechanism formed by two pawls 27 and 28 which are mounted on pivots 27' or 28' respectively extending from the rear side of plate 25. Both pawls are linked to each other by a link 29 having a curved downwardly directed tongue 30 for a purpose which will be explained later. A spring 31 extended between a pin 32 of pedal 25 and pawl 28 tends to keep the latter in contact with an abutment pin 33 provided on the back of plate 25.

This pawl mechanism cooperates with pins provided on lever 17 in a particular manner.

If the pawls assume the position illustrated in Fig. 1, the pawl 28 will, in the course of the downward movement of the clutch pedal 25, come into engagement with the pin 34, and will then shift the gear shift lever 17 towards the right. In order to permit such shifting the locked gear shift lever 17 must be released just before the engagement of pawl 28 with pin 34 occurs. To effect such release the clutch actuating member or pedal 25 is provided with a rearwardly projecting pin 35 arranged to engage an abutment plate 36. This plate is mounted on a pivot 37 projecting from the lower end of arm 22 and is subjected to the action of a spring 38 tending to keep the plate 36 against a pin 39 also projecting from arm 22. The rear edge of plate 36 is curved as shown in the drawings so that pin 35 comes into engagement therewith in the course of its upward movement when the pedal 25 is pressed down, and pushes the arm 22 out of its way to the left, as is illustrated in Fig. 2. In this way the arm 19 of the locking lever is raised whereby the shift lever 17 is released. At this phase of the operation or shortly thereafter the pawl 28 engages the pin and swings the gear shift lever 17 to the right. When the pedal 25 is further pressed down pin 35 slips off plate 36 permitting the locking lever 19 to return. Eventually, pin II will arrive in registry with recess 21 and will be re-engaged by the locking lever 19. It is to be noted that the clutch is brought into disengagement before pawl 28 meets pin 34, so that during the shifting phase the clutch is no longer in engagement. When the shifting phase is finished with the re-engagement of the gear shift lever 17 with the locking lever 19 the clutch pedal is released and, owing to its tendency to return, will swing back into its upper position. Plate 36 does not interfere with the return of pedal 25, because it is free to yield upon the engagement with the returning pin 35.

As a consequence of gear shift lever 17 being shifted, a second pin 40 has arrived at the place which pin 34 assumed in the first gear position. It follows, that upon a second actuation of the clutch pedal 25 a similar cycle of operations is repeated with the result that gear shift lever 17 is shifted towards the right a second time whereby it is set to third speed, the pin III being brought into engagement with the recess 21.

Thus, it will appear, that every time the clutch actuating pedal is operated to disengage the clutch, the gear shift lever is automatically released, shifted and re-arrested, when it reaches its next position.

It is to be understood, of course, that provision is made for the possibility of disengaging the clutch without causing a gear shift. In this case pedal 25 is pressed down from its uppermost position to the position shown in Fig. 1, as this will suffice to disengage the clutch.

The pawl 28 merely operates to shift the gear shift lever from left to right, while the pawl 27 serves to perform shifting in the opposite sense. In order to bring the pawl 27 into its operative position and to simultaneously render pawl 28 inactive, a small auxiliary pedal 41 is mounted on a pivot 42 extending from the front of pedal 25 and carries a rearwardly projecting pin 43 extending through a curved slot 44 provided in the pedal plate 25. The pin 43 is adapted to engage the afore-mentioned curved tongue 30. The auxiliary pedal 41 has a flanged end portion on which a pin 45 is mounted to upwardly project through a suitable boring provided in the foot plate 26 of the clutch pedal 25. A spring 48 serves to return the auxiliary pedal into its upper position.

The plate 26 is so dimensioned that it offers a sufficiently large face to the driver's foot that he may actuate the clutch pedal 25 without at the same time stepping down the pin 45. If desired, however, the pin 45 may be stepped down together with the foot pedal as is illustrated in Fig. 4. This causes the pin 43 of the auxiliary pedal to displace the tongue 30 thereby bringing the pawl 27 in a position in which it will engage either a pin 46 or a pin 47, as the case may be. These pins correspond to pins 34 and 40, as far as their function is concerned, i. e. by stepping down pin 45 when actuating the clutch pedal 25, the gear shift lever 17 is moved towards the left. If it is in second speed, it is pin 46 which is engaged, while in third speed pin 47 is the one that cooperates with the pawl.

From the foregoing description it is apparent that the pins 34, 40, 46 and 47 function in exactly the same manner as do the teeth of a ratchet wheel, since for each reciprocation of the pawl the carrier of the pins is turned through a distance corresponding to the pitch, i. e. the distance of the pins. Thus, the lower part of the gear shift lever is really a ratchet-wheel, the teeth of which are represented by the pins 34, 40 on the one side and 46, 47 on the other side. Obviously, any kind of a ratchet-wheel may be used for ensuring the proper cooperation of the clutch actuating member with the gear shift lever, although the construction illustrated offers particular advantages owing to its extreme simplicity.

It has been mentioned that as soon as pin 35 carried at the rear of the clutch pedal slips off plate 36 the upper arm of the locking lever 19 drops to bear with its lower edge on the advancing pin I, II or III, as the case may be, and is now ready to engage the pin as it arrives at the recess 21.

In order to ensure this engagement and to prevent the pin from passing over the recess 21 owing to its rapidity, an abutment lever 49 is pivoted on the lever 19 on the pin 50 and projects with its lower end beyond the lower edge of the lever. Its angular movement is limited by two stop pins 51. When a pin sliding along the lower edge of lever 19 engages the abutment lever 49 it pushes the latter ahead until it arrives in registry with the recess to be engaged. Since the abutment lever 49 is swingably mounted it performs its function whether the pins arrive at the recess from the right or from the left.

The gear of the particular type of motorcycle shown in Fig. 6 has its neutral position arranged between the position for first speed and the position for second speed. In order to lock the gear shift lever 17 in neutral position, the auxiliary recess 23 is provided as has been mentioned heretofore. If this recess were open and unobstructed it would be impossible to shift the gear shift lever from first into second speed or vice versa, because the pins I and II would engage the recess 23. For this reason, a closure lever 52 is pivotally mounted at 53 on arm 19 so that the lower face of its left end is in alignment with the lower edge of arm 19 thereby rendering the auxiliary recess 23 inactive. Hence, this recess will not interfere with the gear shift action so long as the closure lever 52 assumes its normal position. If it is desired, however, to shift the gear into neutral, the closure lever 52 is swung into the position illustrated in Fig. 4. This is performed by actuation of a handle 54 pivoted at 55 on lever 19 and profiled in such a manner as to positively control the position of two pins 57 mounted on lever 52. A spring 58 tends to keep lever 54 in its right hand position illustrated in Figs. 1, 2 and 3 in which the auxiliary recess 23 is closed.

A pin 59 mounted on a projection of the base plate 13 serves in this position as a stop for the upper arm of lever 54. If the driver desires to shift the gear to neutral, he must first shift to first or second gear and, then, push lever 54 with his foot into its forward position shown in Fig. 4. Thus, the auxiliary recess 23 is opened and will be kept open by action of a pawl 60 mounted at 61 on arm 22 and provided with a hook 62 adapted to slip over pin 63 which is arranged at the right end of the closure lever 52. Spring 64 tends to turn the pawl 60 into its engaging position. It will thus be seen that upon actuation of lever 54, the parts are in the position represented in Fig. 4 which is based on the assumption that the gear had been shifted to second speed. By stepping on foot plate 26 and pin 45 the gear will now be shifted into neutral. Fig. 4 illustrates the moment at which the clutch pedal has been pressed down to the position at which the pawl 27 has arrived at pin 46. In the further course of the movement the pin I will be moved to the auxiliary recess 23. To insure the engagement of the pin I with the auxiliary recess 23, an abutment lever 65 similar to lever 49 is pivotally mounted at 66 on the head of the closure lever 52. In Fig. 5 a side view of this abutment lever is represented showing that the lower end thereof is rearwardly bent to come into the path of the pins I, II or III when the closure lever is raised as is shown in Fig. 4. A pin 67 serves to limit the movement of lever 65 in a similar manner as do the pins 51 in connection with the abutment lever 49, when the closure lever 65 is below the path of the pins I, II or III so as not to interfere with the movement thereof past the closed auxiliary recess 23.

It has been mentioned that the lever 54 is to be pushed forward when it is desired to shift the gear into neutral, and that upon such actuation the pin 63 on the tail of lever 52 is caught by the hook 62 to keep the auxiliary recess 23 open in operative condition for the subsequent shifting operation. Preferably, an arrangement is provided whereby lever 52 is released in the course of the next following shifting operation so that it will close again the auxiliary recess when the gear is shifted out of its neutral position. In the embodiment shown, a pin 68 mounted on plate 36 serves this purpose. It has been mentioned that on the upward return stroke of the clutch pedal 25 its pin 35 presses the plate 36 down out of its way. When this occurs, pin 68 engages the downwardly extending tail of lever 60 thereby releasing the same as will appear from a consideration of Fig. 5 illustrating the moment at which pin 46 is engaged by pedal 27 on the downward stroke of the clutch pedal 25 which is about to shift the gear shift lever 17 into its neutral position with pin I engaging the auxiliary recess 23. By engagement of pin 35 with the plate 36 the locking lever 19 has just been withdrawn from pin II and pin 35 is going to slip off plate 36 whereupon the latter will swing into the path of pin 35 coincidentally with the engagement of pin I with recess 23. As a consequence, plate 36 will be pressed down on the return stroke of the clutch pedal so that the pin 68 will push against the tail piece of lever 60.

It is to be observed that in gears of the type under consideration the clutch must not be re-engaged until the gear shift lever has fully been shifted into one of its definite predetermined positions, as injury to the gears is likely to result when this rule is disregarded. Preferably means are provided which positively prevent a premature re-engagement of the clutch.

In the embodiment shown a movable keeper 69 pivotally mounted on base plate 13 at 70 serves this purpose. It is controlled by the arm 22 of the locking lever 19 through a pin and slot connection 71 and has an upper offset shoulder 72 extending into the path of pin 35. Fig. 2 shows that the shoulder 72 does not interfere with pin 35 when the clutch pedal 25 is pressed down to withdraw the locking lever 19 from the pins I, II or III.

If the pedal 25 is prematurely released, however, before it is entirely pressed down to bring one of the pins I, II or III to registry with one of the recesses of the locking lever so that the latter cannot be pulled by its spring 24 into the position illustrated in Fig. 1 but remains in the intermediary position illustrated in Fig. 3, the shoulder 72 will engage pin 35 and thus keep pedal 25 from returning into its clutch engaging position. In this manner, my invention provides for a reliable and simple arrangement obviating any injury to the gear following from a faulty actuation.

What I claim is:

1. A gear shift mechanism for a motor vehicle comprising, in combination with a shiftable gear and a clutch both forming part of the power transmitting system of said vehicle, a clutch pedal tending to remain in its clutch-engaging position, a gear shift lever adapted to stepwise shift said gear into different speeds corresponding to different positions of said gear shift lever, a ratchet-wheel-like element united with said lever, a pawl mechanism carried by said pedal in operative relation to said element to advance the latter by one step every time said pedal is pressed into its disengaging position, and setting means coordinated to said pawl mechanism and adapted to alternatively bring the same into engagement with one of the opposite sides of said ratchet-wheel-like element whereby the latter may be advanced in an alternative direction of rotation depending on the adjustment of said setting means.

2. A gear shift mechanism for a motor vehicle comprising, in combination with a shiftable gear and a clutch both forming part of the power transmitting system of said vehicle, a clutch pedal tending to remain in its clutch-engaging position, a gear shift lever adapted to stepwise shift said gear into different speeds corresponding to different positions of said gear shift lever, a ratchet-wheel-like element united with said lever, two pawls linked to said pedal and to each other and arranged to successively and alternatively engage one of opposite sides of said ratchet-wheel-like element to advance the same by one step every time said pedal is pressed into its disengaging position, a recessed locking lever adapted to engage and to lock said gear shift lever in any one of said different positions, and an abutment operated by said pedal to engage said locking means to temporarily withdraw the same prior to the engagement of one of said pawls with said ratchet-wheel-like element.

3. A gear shift mechanism for a motor vehicle comprising, in combination with a shiftable gear and a clutch both forming part of the power transmitting system of said vehicle, a clutch pedal tending to remain in its clutch-engaging position, a gear shift lever adapted to stepwise shift said gear into different speeds corresponding to different positions of said gear shift lever, a ratchet-wheel-like element united with said lever, two pawls linked to said pedal and to each other and arranged to alternatively engage one of opposite sides of said ratchet-wheel-like element to advance the same by one step every time said pedal is pressed into its disengaging position, a recessed locking lever adapted to engage and to lock said gear shift lever in any one of said different positions, an abutment operated by said pedal to engage said locking means to temporarily withdraw the same prior to the engagement of one of said pawls with said ratchet-wheel-like element, a movable keeper controlled by said locking lever and adapted in any intermediate position thereof, to keep said clutch pedal from returning into its clutch engaging position, whereby the clutch is prevented from being engaged unless said gear shift lever assumes one of said positions.

In testimony whereof I have affixed my signature.

FRIED. ERNST BENZING.